United States Patent
Jung et al.

(10) Patent No.: US 10,388,062 B2
(45) Date of Patent: Aug. 20, 2019

(54) VIRTUAL CONTENT-MIXING METHOD FOR AUGMENTED REALITY AND APPARATUS FOR THE SAME

(71) Applicant: ELECTRONICS AND TELECOMMUNICATIONS RESEARCH INSTITUTE, Daejeon (KR)

(72) Inventors: Yu-Gu Jung, Daejeon (KR); Jae-Hwan Kim, Daejeon (KR); Ho-Won Kim, Seoul (KR); Byung-Ok Han, Daejeon (KR); Chang-Joon Park, Daejeon (KR); Gil-Haeng Lee, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/832,553

(22) Filed: Dec. 5, 2017

(65) Prior Publication Data

US 2019/0012828 A1    Jan. 10, 2019

(30) Foreign Application Priority Data

Jul. 7, 2017    (KR) .................. 10-2017-0086616

(51) Int. Cl.
*G06T 15/50* (2011.01)
*G06T 15/20* (2011.01)
*G06T 7/507* (2017.01)
*G06T 19/20* (2011.01)

(52) U.S. Cl.
CPC ............ *G06T 15/506* (2013.01); *G06T 7/507* (2017.01); *G06T 15/205* (2013.01); *G06T 19/20* (2013.01)

(58) Field of Classification Search
CPC .. G06K 9/00664–00704; G06F 3/0481; G06F 3/04817; G06F 9/4443; G06F 3/04847; G06F 11/3664; G06F 3/012; G06F 3/0304; G06F 3/011–015; G06T 19/00; G06T 17/00; G06T 19/006; G06T 2215/16; H04N 5/272; H04N 2201/3245; A63F 13/10
See application file for complete search history.

(56) References Cited

U.S. PATENT DOCUMENTS 8,077,906 B2    12/2011  Yu et al.
2004/0150641 A1*  8/2004  Duiker ................... G06T 13/80
                                                    345/426

(Continued)

FOREIGN PATENT DOCUMENTS

KR    10-2015-0071595 A    6/2015
KR    10-2016-0147434 A    12/2016
KR       10-1684139 B1      12/2016

*Primary Examiner* — Todd Buttram

(57) ABSTRACT

Disclosed herein are a virtual content-mixing method for augmented reality and an apparatus for the same. The virtual content-mixing method includes generating lighting physical-modeling data based on actual lighting information for outputting virtual content, generating camera physical-modeling data by acquiring a plurality of parameters corresponding to a camera, and mixing the virtual content with an image that is input through an RGB camera, based on the lighting physical-modeling data and the camera physical-modeling data.

18 Claims, 14 Drawing Sheets

(56) References Cited

U.S. PATENT DOCUMENTS

2010/0303344 A1* 12/2010 Sato .................. H04N 9/045
                                                   382/162
2015/0187139 A1    7/2015 Ahn
2017/0024928 A1*  1/2017 Su muth ............ G06Q 30/0621

* cited by examiner

VIRTUAL CONTENT-MIXING METHOD FOR AUGMENTED REALITY AND APPARATUS FOR THE SAME

CROSS REFERENCE TO RELATED APPLICATION

This application claims the benefit of Korean Patent Application No. 10-2017-0086616, filed Jul. 7, 2017, which is hereby incorporated by reference in its entirety into this application.

BACKGROUND OF THE INVENTION

1. Technical Field

The present invention relates generally to virtual content-mixing technology for augmented reality, and more particularly, to a virtual content-mixing method for augmented reality and an apparatus for the method, which mix three-dimensional (3D) virtual content so that the 3D virtual content can appear more similar to objects in a real environment in augmented reality which has recently been in the spotlight.

2. Description of the Related Art

Recently, with the advent of the game "Pokémon Go", in which virtual game characters are mixed with the real world and then shown to users, augmented reality technology has become a hot topic. The aim of such augmented reality technology is to obtain results in which three-dimensional (3D) virtual content is provided so as to be very similar to actual objects (images) to such an extent that the 3D virtual content is undistinguishable from the actual objects in an indoor environment in which lighting is limited.

One of the reasons that 3D virtual content viewed in augmented reality technology is easily recognized as not being real is the problem of unnatural application of lighting to 3D virtual content.

Further, current augmented reality technology is mainly used in a mobile environment. Therefore, there are difficulties in that the difference between the colors of an image of an actual object and 3D virtual content must be corrected in real time due to camera-related values of each mobile device, that is, a camera exposure value, brightness change attributable to the change in ISO sensitivity, a noise degree, etc. With regard to this, Korean Patent Application Publication No. 10-2015-0071595 (Date of publication: Jun. 26, 2015) discloses a technology related to "Constructing Augmented Reality Environment with Pre-computed Lighting."

SUMMARY OF THE INVENTION

Accordingly, the present invention has been made keeping in mind the above problems occurring in the prior art, and an object of the present invention is to provide a more natural augmented reality service by applying a lighting effect similar to that of a captured actual image to virtual content even if lighting is not actually present.

Another object of the present invention is to immediately incorporate changed items into 3D virtual content based on predefined and stored parameter values even if a parameter of a camera mounted on a mobile device is changed in real time.

A further object of the present invention is to provide an augmented reality service, which can be stably operated even in low-specification devices, such as mobile devices, and can provide more natural mixed results.

In accordance with an aspect of the present invention to accomplish the above objects, there is provided a virtual content-mixing apparatus, including a memory for storing lighting physical-modeling data generated in accordance with actual lighting information for outputting virtual content based on mirror ball image capture, and storing camera physical-modeling data generated by acquiring a plurality of parameters corresponding to a camera; and a processor for mixing the virtual content with an image that is input through an RGB camera, based on the lighting physical-modeling data and the camera physical-modeling data.

The processor may be configured to acquire lighting properties corresponding to the lighting information based on a lighting environment map, wherein the lighting environment map may be created by representing at least two mirror ball images acquired based on mirror ball image capture by respective latitude-longitude images and by morphing the at least two latitude-longitude images.

The memory may be configured to acquire a parameter corresponding to at least one of a lens distortion parameter, a color distortion parameter, and a white balance, which correspond to the camera, and to store the acquired parameter in a camera modeling database.

The processor may be configured to acquire at least one camera parameter corresponding to the image, to change the plurality of parameters in accordance with the at least one camera parameter based on the camera modeling database, and to apply the changed parameters to rendering of the virtual content.

The lighting properties may be allocated so as to respectively correspond to multiple coordinates included in the lighting environment map that is constructed in an array in a three-dimensional (3D) space.

The processor may be configured to render the virtual content by applying lighting properties at coordinates corresponding to a location of the virtual content, among the multiple coordinates, to the virtual content.

The processor may be configured to check a change in at least one of a color checker and a grayscale checker while receiving fixed values for the plurality of parameters and changing the lighting information based on the fixed values, and to construct a lighting modeling database based on the change in at least one of the color checker and the grayscale checker.

The processor may be configured to render a shadow of the virtual content based on the lighting modeling database.

In accordance with another aspect of the present invention to accomplish the above objects, there is provided a virtual content-mixing apparatus, including a memory for storing lighting physical-modeling data generated in accordance with actual lighting information for outputting virtual content based on an RGB sensor and a depth sensor, and storing camera physical-modeling data generated by acquiring a plurality of parameters corresponding to a camera; and a processor for mixing the virtual content with an image that is input through an RGB camera, based on the lighting physical-modeling data and the camera physical-modeling data.

The processor may be configured to acquire images for respective camera angles based on the RGB sensor and the depth sensor, to extract a location of lighting based on RGB images, among the images for respective camera angles, to acquire a depth value based on depth images mapped to the RGB images, among the images for respective camera angles, and to obtain 3D coordinates of the lighting corresponding to the lighting information based on the location of the lighting and the depth value.

The memory may be configured to acquire a parameter corresponding to at least one of a lens distortion parameter, a color distortion parameter, and a white balance, which correspond to the camera, and to store the acquired parameter in a camera modeling database.

The processor may be configured to acquire at least one camera parameter corresponding to the image, to change the plurality of parameters in accordance with the at least one camera parameter based on the camera modeling database, and to apply the changed parameters to rendering of the virtual content.

The processor may be configured to check a change in at least one of a color checker and a grayscale checker while receiving fixed values for the plurality of parameters and changing the lighting information based on the fixed values, and to construct a lighting modeling database based on the change in at least one of the color checker and the grayscale checker.

The processor may be configured to render a shadow of the virtual content based on the lighting modeling database.

In accordance with a further aspect of the present invention to accomplish the above objects, there is provided a virtual content-mixing method, including generating lighting physical-modeling data based on actual lighting information for outputting virtual content; generating camera physical-modeling data by acquiring a plurality of parameters corresponding to a camera; and mixing the virtual content with an image that is input through an RGB camera, based on the lighting physical-modeling data and the camera physical-modeling data.

Generating the lighting physical-modeling data may include representing at least two mirror ball images acquired based on mirror ball image capture by respective latitude-longitude (lat-long) images; creating a lighting environment map by morphing the at least two latitude-longitude images; and acquiring lighting properties corresponding to the lighting information based on the lighting environment map.

Generating the lighting physical-modeling data may include acquiring images for respective camera angles based on an RGB sensor and a depth sensor; extracting a location of lighting based on RGB images, among the images for respective camera angles, and acquiring a depth value based on depth images mapped to the RGB images, among the images for respective camera angles; and obtaining 3D coordinates of the lighting corresponding to the lighting information based on the location of the lighting and the depth value.

Generating the camera physical-modeling data may be configured to acquire a parameter corresponding to at least one of a lens distortion parameter, a color distortion parameter, and a white balance, which correspond to the camera, and to store the acquired parameter in a camera modeling database.

Mixing the virtual content with the input image may be configured to acquire at least one camera parameter corresponding to the image, to change the plurality of parameters in accordance with the at least one camera parameter based on the camera modeling database, and to apply the changed parameters to rendering of the virtual content.

The lighting properties may be allocated so as to respectively correspond to multiple coordinates included in the lighting environment map that is constructed in an array in a 3D space.

Mixing the virtual content with the input image may be configured to render the virtual content by applying lighting properties at coordinates corresponding to a location of the virtual content, among the multiple coordinates, to the virtual content.

Generating the lighting physical-modeling data may include checking a change in at least one of a color checker and a grayscale checker while receiving fixed values for the plurality of parameters and changing the lighting information based on the fixed values; and constructing a lighting modeling database based on the change in at least one of the color checker and the grayscale checker.

Mixing the virtual content with the input image may be configured to render a shadow of the virtual content based on the lighting modeling database.

BRIEF DESCRIPTION OF THE DRAWINGS

The above and other objects, features and advantages of the present invention will be more clearly understood from the following detailed description taken in conjunction with the accompanying drawings, in which.

DESCRIPTION THE PREFERRED EMBODIMENTS

Figure 1:
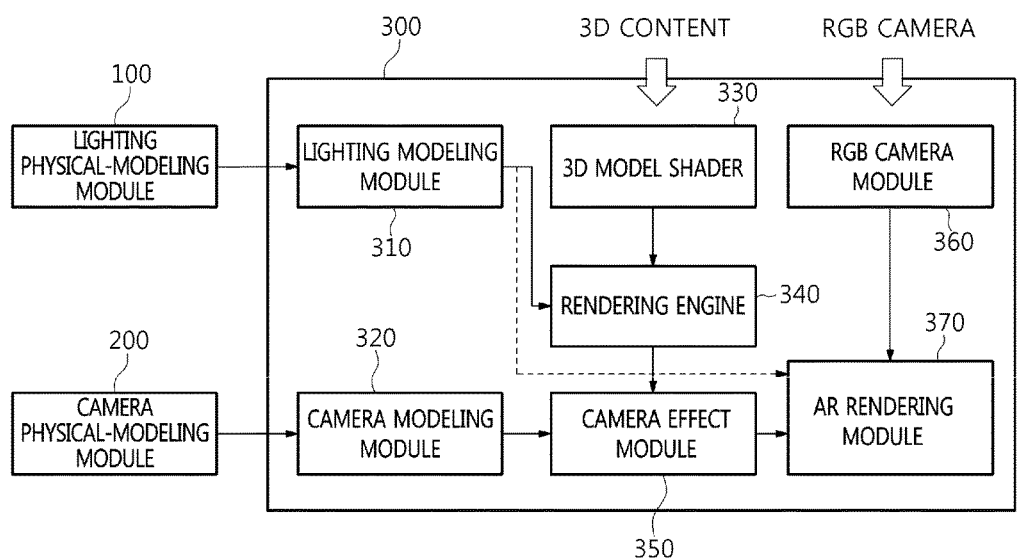
FIG. 1 is a block diagram illustrating the processor of a virtual content-mixing apparatus for augmented reality according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, preferred embodiments of the present invention will be described in detail with the attached drawings.

FIG. 1 is a block diagram illustrating the processor of a virtual content-mixing apparatus for augmented reality according to an embodiment of the present invention.

Referring to FIG. 1, the processor of the virtual content-mixing apparatus for augmented reality according to the embodiment of the present invention chiefly includes a lighting physical-modeling module 100, a camera physical-modeling module 200, and a rendering module 300.

The virtual content-mixing apparatus for augmented reality according to the embodiment of the present invention may include memory for storing various types of data, together with the processor illustrated in FIG. 1. Here, the memory may be present separately from the processor, or may be present such that the memory is included in each of modules constituting the processor.

However, in the present invention, most operations of virtual content-mixing for augmented reality can be performed by the processor, and thus the virtual content-mixing apparatus will be mainly described based on the structure of the processor in FIG. 1.

The lighting physical-modeling module 100 may create a lighting environment map based on actual lighting information for outputting virtual content, and may generate lighting physical-modeling data including lighting properties based on the lighting environment map.

Figure 2:
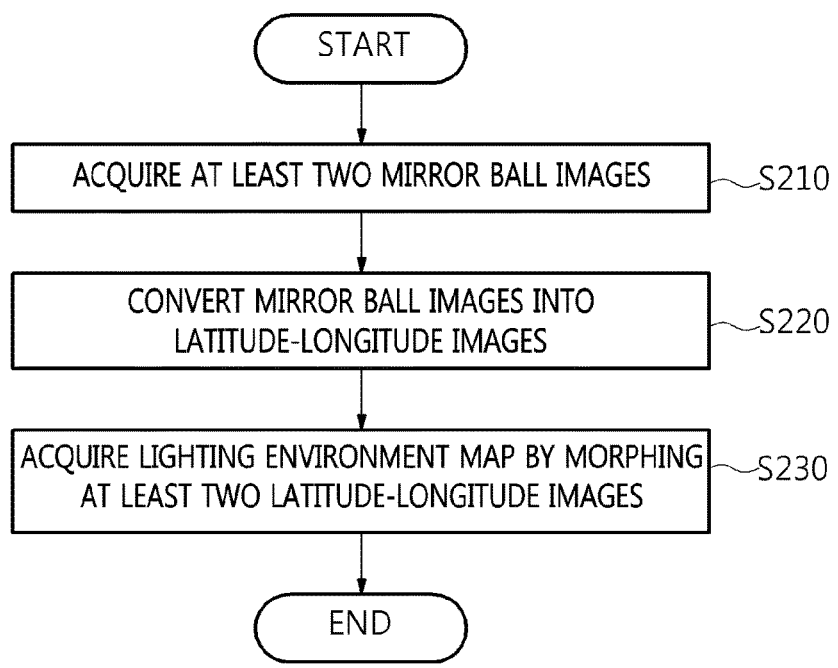
FIG. 2 is an operation flowchart illustrating a procedure for generating lighting physical-modeling data based on mirror ball image capture in a virtual content-mixing method according to an embodiment of the present invention.
Figure 5:
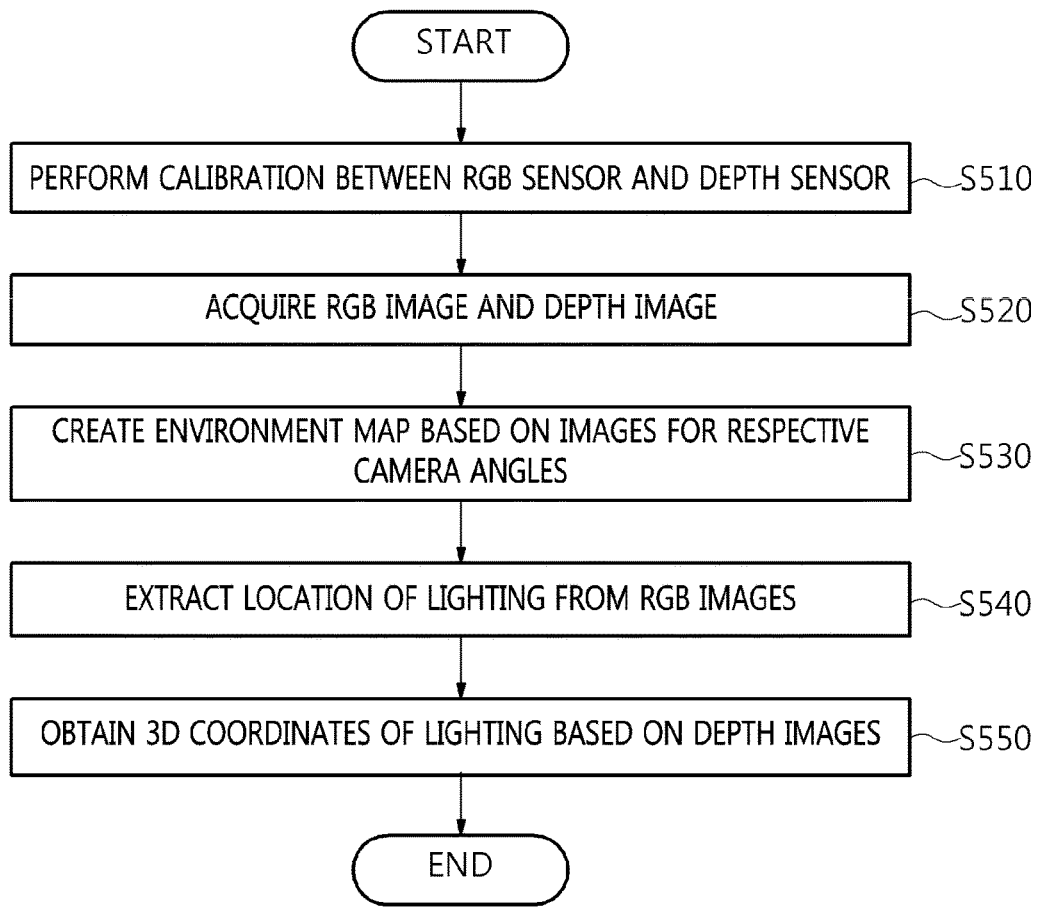
FIG. 5 is an operation flowchart illustrating in detail a procedure for generating lighting physical-modeling data based on an RGB sensor and a depth sensor in the virtual content-mixing method according to an embodiment of the present invention.

Here, the lighting physical-modeling module 100 may create the lighting environment map using a method corresponding to any one of a procedure for generating lighting physical-modeling data based on mirror ball image capture illustrated in FIG. 2 and a procedure for generating lighting physical-modeling data based on an RGB sensor and a depth sensor illustrated in FIG. 5.

First, in the procedure for generating lighting physical-modeling data based on mirror ball image capture illustrated in FIG. 2, the lighting physical-modeling module 100 may acquire at least two mirror ball images based on mirror ball image capture at step S210.

Thereafter, at least two latitude-longitude images may be generated by performing a procedure for spreading the at least two mirror ball images in a latitude-longitude (lat-long) format at step S220.

Figure 3:
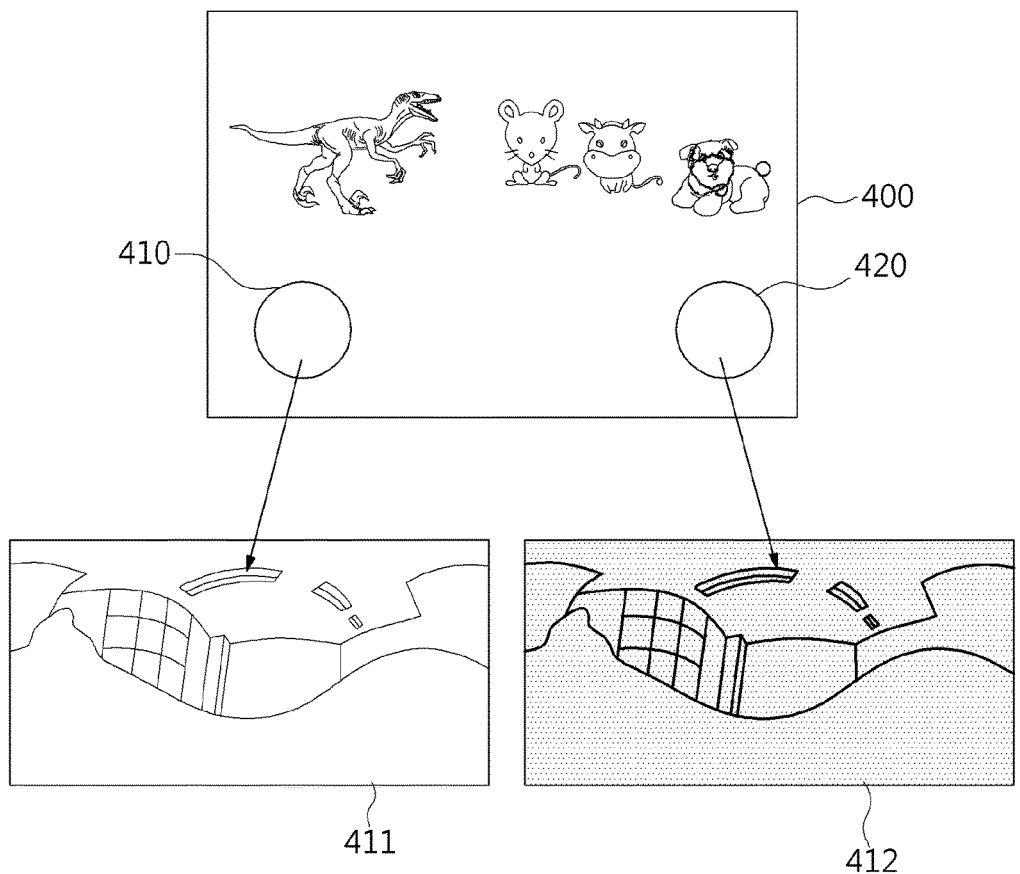
FIGS. 3 and 4 are diagrams illustrating an example of a procedure for creating a lighting environment map and mixing virtual content based on the created lighting environment map according to the present invention.

For example, an input image 4000 including the mirror balls may be acquired, as illustrated in FIG. 3, by capturing an image of a real environment in which the mirror balls are included. Thereafter, mirror ball images 410 and 420, which are regions corresponding to the mirror balls, may be extracted from the input image 400, and the latitude-longitude images 411 and 412, illustrated in FIG. 3, may be generated by spreading the mirror ball images 410 and 420 in a lat-long format.

Thereafter, a lighting environment map may be created by morphing the at least two latitude-longitude images.

For example, the lighting physical-modeling module 100 may create a lighting environment map 413, such as that illustrated in FIG. 5, by comparing the two latitude-longitude images 411 and 412 generated based on the mirror ball images 410 and 420 to search for feature points and by morphing the two latitude-longitude images 411 and 412 based on at least one found feature point. Here, the lighting environment map 413 may be an intermediate image acquired by mixing the two latitude-longitude images 411 and 412.

Here, lighting properties corresponding to the actual lighting information may be acquired based on the lighting environment map, and virtual content may be more naturally mixed with the images by utilizing the lighting properties.

Figure 4:
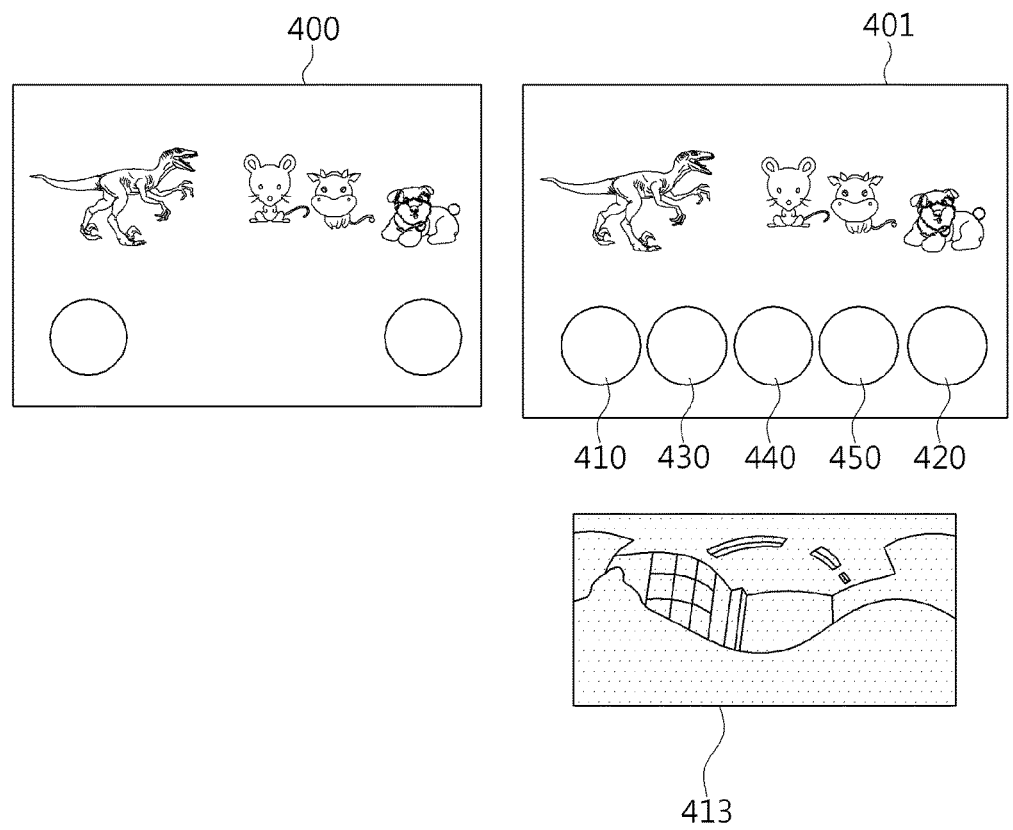

That is, as illustrated in FIG. 4, pieces of virtual content 430, 440, and 450 may be mixed with the input image with a feeling of lighting similar to that in a region that does not correspond to the mirror balls in the input image 400 by applying the lighting environment map 413 to the mixing of the pieces of virtual content 430, 440, and 450.

Here, the lighting properties may be allocated so as to respectively correspond to multiple coordinates included in a lighting environment map constructed in an array in 3D space.

Here, the lighting environment map constructed in an array in 3D space may be incorporated into 3D virtual content mixed with an image input through an RGB camera, and may be applied so as to correspond to the coordinates of the 3D virtual content in space, such as an indoor room.

Here, a description of the lighting environment map, constructed in an array in 3D space, will be made in detail later with reference to FIGS. 9 and 10.

Further, the procedure for generating lighting physical-modeling data based on the RGB sensor and the depth sensor illustrated in FIG. 5 may perform calibration between the RGB sensor and the depth sensor in order to calibrate the coordinates of images acquired through respective sensors at step S510.

Figure 6:
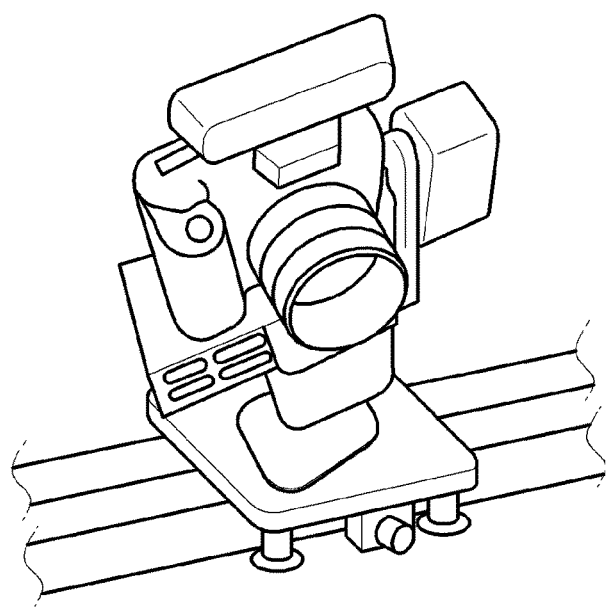
FIG. 6 is a diagram illustrating an embodiment of a device for acquiring an RGB image and a depth image according to the present invention.

For example, calibration between the two sensors may be performed by capturing an image of a calibration board, such as a checkerboard, using an image-capturing device equipped with both the RGB sensor and the depth sensor, as illustrated in FIG. 6.

Here, the imaging-capturing device illustrated in FIG. 6 may acquire a hemispheric image using a pan/tilt mechanism. Further, in addition to the image-capturing device illustrated in FIG. 6, a mobile device including a depth sensor may be used, and alternatively, a depth sensor may be attached to and used by a Personal Computer (PC), a tablet PC, or a notebook computer that includes an RGB sensor.

Thereafter, an RGB image and a depth image may be respectively acquired using the calibrated RGB sensor and depth sensor at step S520. In this case, an RGB image and depth images may be acquired for each angle of the image-capturing device illustrated in FIG. 6, and then the lighting environment map may be created based on the acquired images at step S530.

Thereafter, the location of indoor lighting, which is currently being captured by the image-capturing device, may be extracted from the RGB images for respective angles at step S540.

Next, a depth value at the extracted lighting location may be acquired through depth images for respective angles mapped to the RGB images for respective angles, and 3D coordinates of the indoor lighting location may be acquired at step S550.

That is, even if the camera of the mobile device including the depth sensor or an additional device, rather than the image-capturing device illustrated in FIG. 6, is used, the location of lighting in 3D space may be detected by capturing an image of indoor space and by acquiring RGB images and depth images in the same way as that performed using a pan-tilt mechanism based on the indoor space information.

The camera physical-modeling module 200 may construct a camera modeling database (DB) by acquiring a plurality of parameters corresponding to the camera and then generating camera physical-modeling data.

Figure 7:
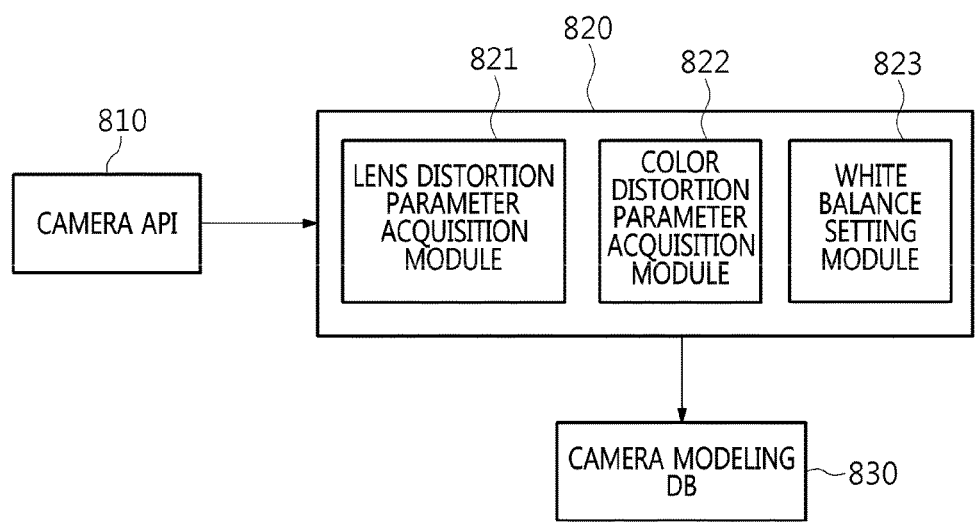
FIG. 7 is a block diagram illustrating an embodiment of the camera physical-modeling module illustrated in FIG. 1.

Here, the camera physical-modeling module 200 may include a camera Application Programming Interface (API) 810, a camera property modeling module 820, and a camera modeling DB 830, as illustrated in FIG. 7.

Here, the camera API 810 may denote various types of camera models and unique properties of respective cameras. For example, the camera API 810 may mean various types of cameras, such as a Digital Single Lens Reflex (DSLR) camera, an Android phone camera, and an iPhone camera, and properties, such as a focus, a focal length, a zoom factor, exposure, white balance, color space, a black level, a lens-shading map, and a tone map curve.

In this case, depending on the unique properties of the camera API 810, the extent of distortion may vary between images. Therefore, in order to solve this problem, a plurality of parameters for correcting distortion of the camera may be acquired through the camera property modeling module 820.

Here, a parameter corresponding to at least one of a lens distortion parameter, a color distortion parameter, and white balance, which correspond to the camera, may be acquired based on a lens distortion parameter acquisition module 821, a color distortion parameter acquisition module 822, and a white balance setting module 823, which constitute the camera property modeling module 820, and may then be stored in the camera modeling DB 830.

The lens distortion parameter acquisition module 821 may acquire parameters related to lens distortion of the camera, and may store all of lens distortion parameters attributable to zoom-in or zoom-out of the camera.

Figure 8:
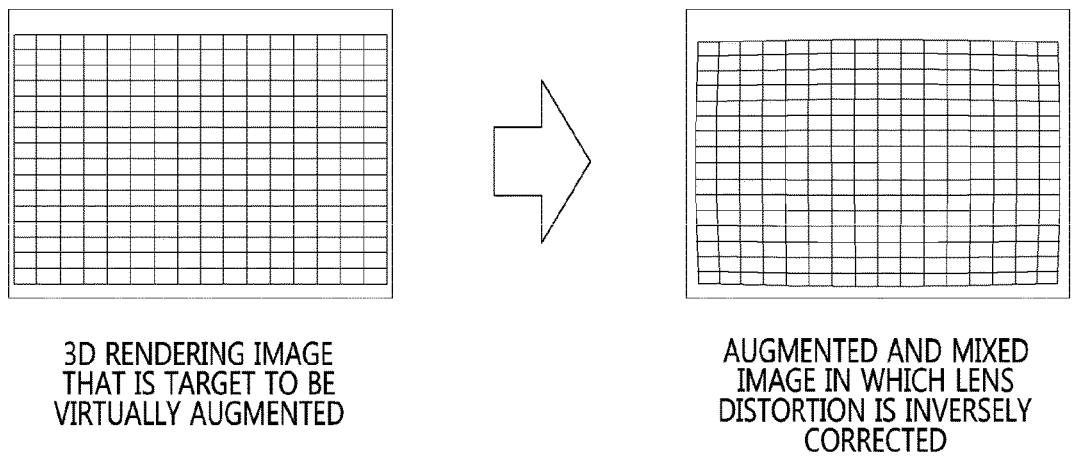
FIG. 8 is a diagram illustrating an example of an image in which lens distortion of a camera is corrected according to the present invention.

For example, the lens distortion parameters may be used to correct a 3D rendering image, which is the target to be virtually augmented, into an image such as an augmented and mixed image, in which lens distortion is inversely corrected, as illustrated in FIG. 8.

The color distortion parameter acquisition module 822 may acquire parameters related to color distortion of the camera, and may obtain and store a value indicating how colors have been distorted from an image obtained by capturing a Macbeth color board.

For example, when an image of a 3D model of the Macbeth color board is captured, color distortion parameters may be acquired based on information about the distortion of colors between a real 3D model and the image of the 3D model captured by the camera. Thereafter, in order to inversely correct the colors of the model image captured by the camera, virtual content may be created by applying a color distortion parameter-based post-processing filter to the model image. By means of this procedure a Macbeth color board in an actual image (a real image) may be augmented and mixed with a Macbeth color board in virtual content very similar to the Macbeth color board.

Here, the white balance setting module 823, which is configured to adjust the white balance of virtual content, may store a value obtained by capturing an image of a white patch.

The camera modeling DB 830 may be constructed by storing various values related to the camera, including the lens distortion parameters, color distortion parameters, and white balance of the camera, which are acquired through this procedure.

Here, pieces of data stored in the camera modeling DB 830 may be used to distort or correct the attributes of the virtual content that is augmented and mixed so that the virtual content becomes similar to the actual image by changing the values of the corresponding data in real time whenever the values of the camera are changed.

The rendering module 300 may mix 3D virtual content with an image, input from the RGB camera, through a rendering engine 340 based on the lighting physical-modeling data and the camera physical-modeling data.

Here, the rendering module 300 may include a lighting modeling module 310, a camera modeling module 320, a 3D model shader 330, the rendering engine 340, a camera effect module 350, an RGB camera module 360, an Augmented Reality (AR) rendering module 370, and a lighting check module 1110.

Figure 9:
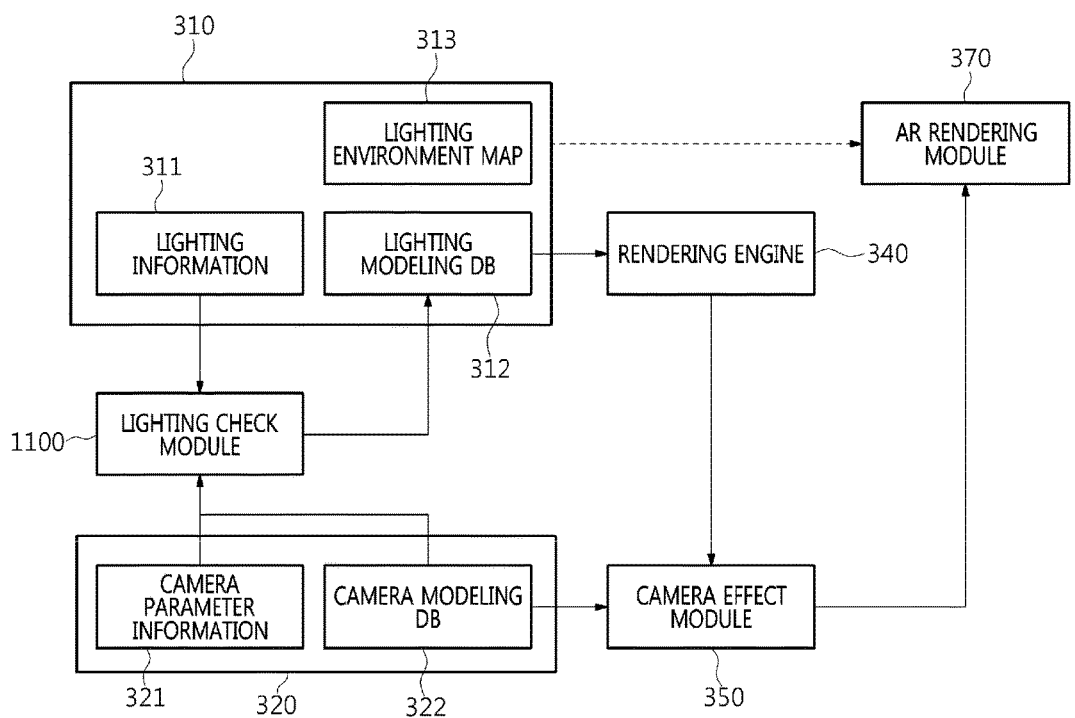
FIG. 9 is a block diagram illustrating an embodiment of the rendering module illustrated in FIG. 1.

Here, FIG. 9 illustrates how lighting physical-modeling data and camera physical-modeling modeling data are incorporated into virtual content in the rendering module 300.

First, the lighting modeling module 310 included in the rendering module 300 may construct a lighting modeling DB 312 by performing the step of acquiring lighting information 311 and a lighting environment map 313 from the lighting physical-modeling module 100, illustrated in FIG. 1, and of verifying the acquired information.

Figure 10:
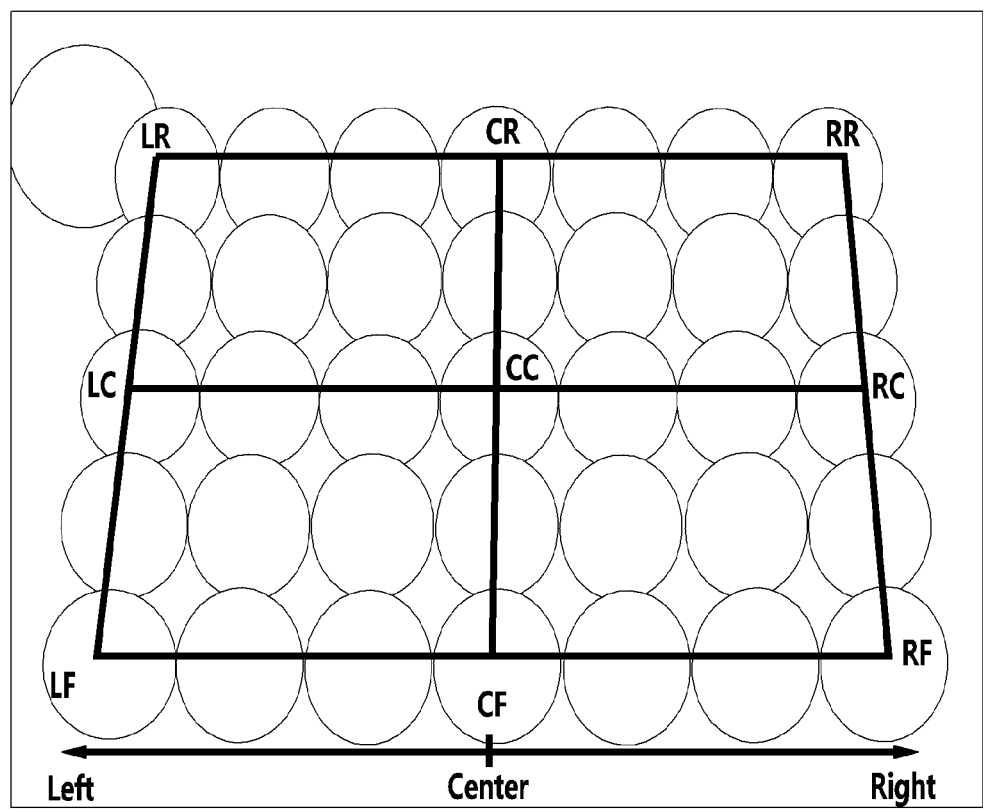
FIG. 10 is a diagram illustrating an example of a lighting environment map constructed in an array in 3D space according to the present invention.

Here, the lighting modeling module 310 may construct a lighting environment map in an array in 3D space, as illustrated in FIG. 10, using the lighting environment map 313 acquired from the lighting physical-modeling module 100.

For example, the lighting environment map in 3D space may be constructed in such a way that, as illustrated in FIG. 10, lighting environment maps respectively corresponding to nine vertices LR, CR, RR, LC, CC, RC, LF, CF, and RF are created first, and lighting environment maps for the remaining regions are subsequently created by performing linear interpolation between the lighting environment maps corresponding to respective vertices.

Here, the array-type lighting environment map constructed as illustrated in FIG. 10 may be incorporated into 3D virtual content by the AR rendering module 370. In detail, the array-type lighting environment map may be applied so as to correspond to the coordinates of 3D virtual content in space, such as an indoor room.

That is, the lighting environment map may be applied to the virtual content in such a way as to apply lighting properties allocated to coordinates corresponding to the location of the virtual content, among multiple coordinates that are included in the lighting environment map constructed in an array (i.e. the array-type lighting environment map), to the virtual content.

In this case, the rendering module 300 may construct the lighting modeling DB 312 by inputting lighting information 311, camera parameter information 321, and camera physical-modeling data stored in the camera modeling DB 322, to the lighting check module 1100, based on the lighting modeling module 310 and the camera modeling module 320.

Here, the lighting check module 1100 may check a change in at least one of a color checker and a grayscale checker while receiving the camera parameter information 321 and the camera physical-modeling data stored in the camera modeling DB 322 as fixed values and receiving only the lighting information 311 as a changed value.

Figure 11:
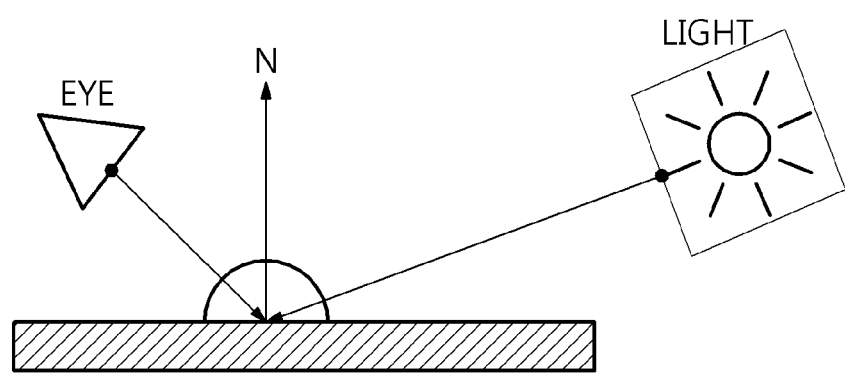
FIG. 11 is a diagram illustrating an embodiment of a method for constructing a lighting modeling database according to the present invention.

For example, in FIG. 11, a change in the color checker and the grayscale checker may be checked while "EYE", which may correspond to the camera parameter information 321 and the camera modeling DB 322, is fixed, and only "LIGHT", which corresponds to the lighting information 311, is changed.

That is, as the change in at least one of the color checker and the grayscale checker is checked, values to which a color value and a grayscale value in the rendering engine 340 correspond may be detected, and thus the lighting modeling DB 312 may be constructed based on the values generated in this way.

Here, the lighting information 311 may be acquired from the lighting physical-modeling module 100, and may correspond to at least one of the location, type, brightness, and color of lighting.

Further, the shadow of the virtual content may be rendered by the rendering engine 340 using the lighting modeling DB 312 generated in this way.

Also, the rendering module 300 may transfer the information of the camera-modeling module 320 to the camera effect module 350, thus enabling a camera physical model to be applied to the virtual content.

Figure 12:
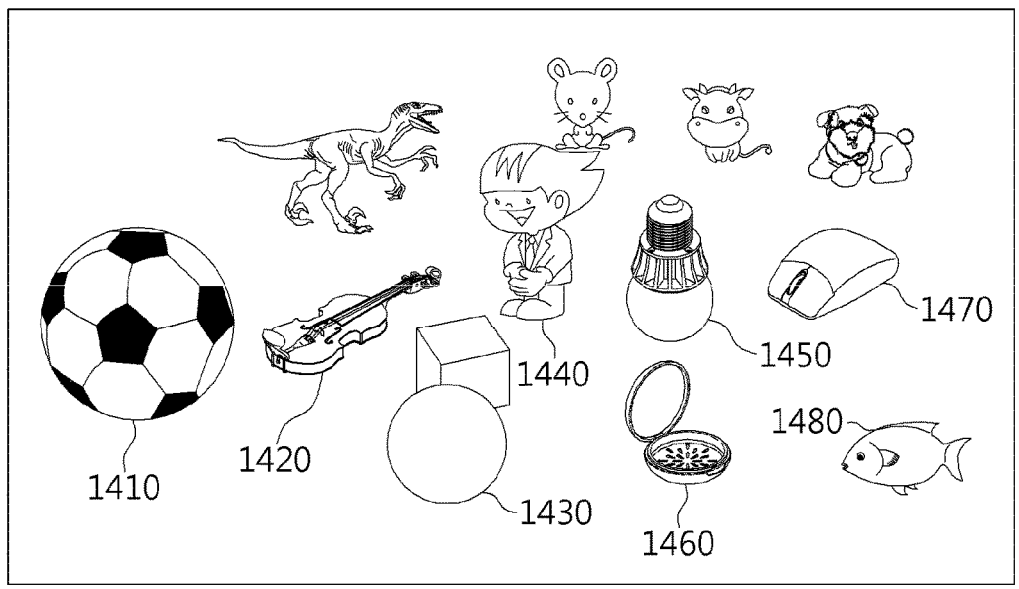
FIG. 12 is a diagram illustrating an example of an augmented reality image in which virtual content is mixed with an image according to the present invention.

For example, lens distortion, color distortion, white balance, etc. corresponding to the image that has been input through the RGB camera may be inversely applied to the 3D virtual content, and a mixed image in which pieces of virtual content 1410 to 1480 are naturally augmented and mixed with an actual image may be provided, as illustrated in FIG. 12.

Such a virtual content-mixing apparatus including the processor is used, so that a lighting effect similar to that of a captured actual image is applied to virtual content even if lighting is not actually present, and thus a more natural augmented reality service may be provided.

Further, the present invention may immediately incorporate changed items into 3D virtual content, based on predefined and stored parameter values, even if the parameters of a camera mounted on a mobile device are changed in real time, and may provide an augmented reality service, which can be stably operated even on low-specification devices, such as mobile devices and which can provide more natural mixed results.

Figure 13:
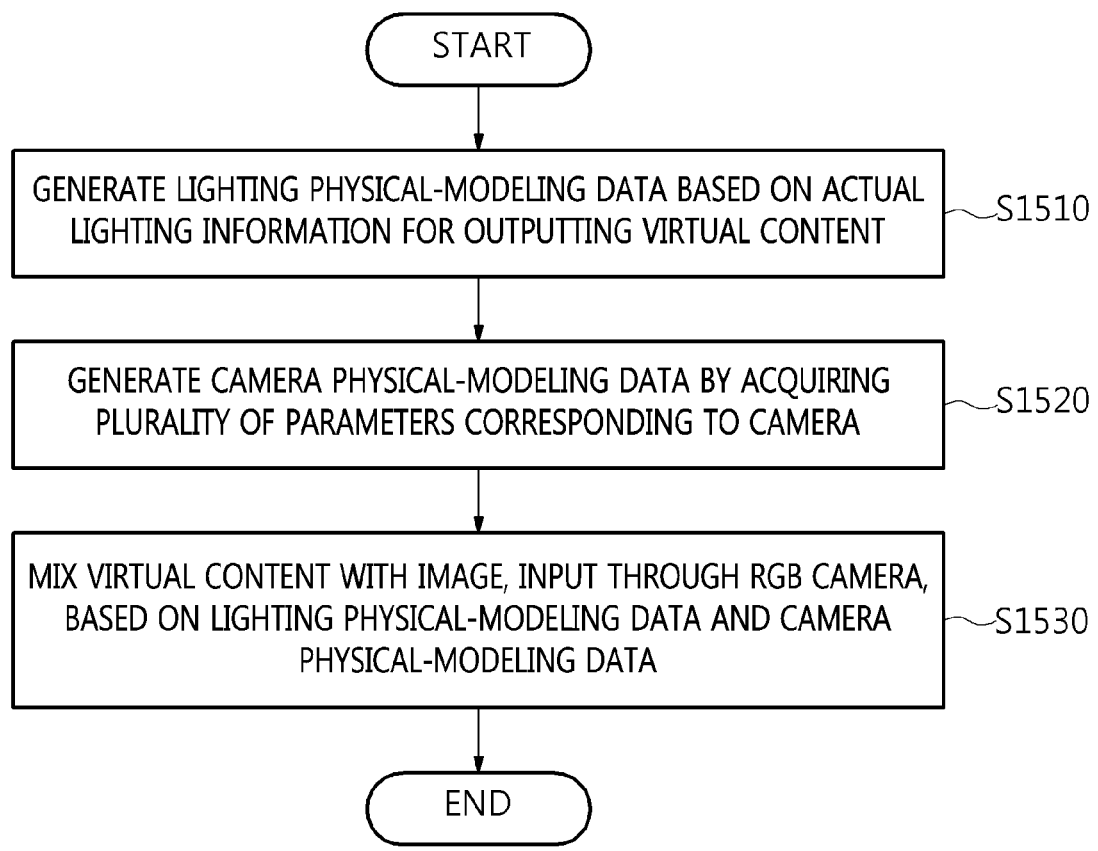
FIG. 13 is an operation flowchart illustrating a virtual content-mixing method for augmented reality according to an embodiment of the present invention.

FIG. 13 is an operation flowchart illustrating a virtual content-mixing method for augmented reality according to an embodiment of the present invention.

Referring to FIG. 13, the virtual content-mixing method for augmented reality according to the embodiment of the present invention generates lighting physical-modeling data based on actual lighting information for outputting virtual content at step S1510.

Here, the virtual content-mixing method for augmented reality according to the embodiment of the present invention may generate lighting physical-modeling data using any one of a method for generating lighting physical-modeling data based on mirror ball image capture and a method for generating lighting physical-modeling data based on an RGB sensor and a depth sensor.

The method for generating lighting physical-modeling data based on mirror ball image capture is described below.

First, at least two mirror ball images acquired based on mirror ball image capture may be respectively represented by latitude-longitude (lat-long) images.

For example, an image including mirror balls may be acquired by capturing an image of a real environment including the mirror balls, and mirror ball images, which are regions corresponding to the mirror balls, may be extracted from the acquired image. Thereafter, the latitude-longitude images may be respectively generated by spreading the mirror ball images in a latitude-longitude format.

In this case, a lighting environment map may be created by morphing the at least two latitude-longitude images.

For example, the lighting environment map may be created by comparing the at least two latitude-longitude images to search for feature points and by morphing the at least two latitude-longitude images based on at least one found feature point.

Here, lighting properties corresponding to the lighting information may be acquired based on the lighting environment map.

Here, the lighting properties may be utilized to more naturally mix virtual content with an actual image. That is, the pieces of virtual content may be mixed with the image, with a feeling of lighting similar to that in a region that does not correspond to mirror ball images, by applying the lighting environment map to the mixing of the virtual content.

Here, the lighting properties may be allocated so as to respectively correspond to multiple coordinates included in a lighting environment map constructed in an array in 3D space.

Here, the lighting environment map constructed in an array in 3D space may be incorporated into 3D virtual content mixed with the image input through an RGB camera, and may be applied so as to correspond to the coordinates of the 3D virtual content in space, such as an indoor room.

Since a description of the lighting environment map constructed in an array in 3D space was made in detail above, with reference to FIGS. 9 and 10, it will be omitted here.

Further, the method for generating lighting physical-modeling data based on an RGB sensor and a depth sensor will be described below.

First, images for respective angles of the camera may be acquired based on the RGB sensor and the depth sensor.

In order to calibrate the coordinates of the images acquired through the respective sensors, calibration between the RGB sensor and the depth sensor may be performed.

For example, calibration between the two sensors may be performed by capturing an image of a calibration board, such as a checkerboard, using a camera or an image-capturing device which is equipped with an RGB sensor and a depth sensor.

Here, the camera or the imaging-capturing device may acquire a hemispheric image using a pan/tilt mechanism. Further, in addition to the camera or the image-capturing device, a mobile device including a depth sensor may be used, and alternatively, a depth sensor may be attached to and used by a Personal Computer (PC), a tablet PC, or a notebook computer that includes an RGB sensor.

Thereafter, an RGB image and a depth image may be respectively acquired using the calibrated RGB sensor and depth sensor, wherein RGB images and depth images may be acquired for respective angles of the camera or the image-capturing device and then the lighting environment map may be created based on the RGB images and the depth images.

Here, the location of lighting is extracted based on RGB images, among the images for respective camera angles, and a depth value may be acquired based on depth images mapped to the RGB images, among the images for respective camera angles.

Here, 3D coordinates of the lighting corresponding to the lighting information may be obtained based on the location of the lighting and the depth value.

That is, even if the mobile device including the depth sensor or an additional device is used, the location of the lighting in 3D space may be detected by capturing an image of indoor space and by acquiring RGB images and depth images in the same way as that performed using a pan-tilt mechanism based on the indoor space information.

Further, the virtual content-mixing method for augmented reality according to the embodiment of the present invention generates camera physical-modeling data by acquiring a plurality of parameters corresponding to the camera at step S1520.

In this case, depending on the unique properties of a camera API, the extent of distortion may vary between images. Therefore, in order to solve this problem, a plurality of parameters for correcting the distortion of the camera may be acquired.

Here, the camera API may denote various types of camera models and unique properties of respective cameras. For example, the camera API may mean various types of cameras, such as a Digital Single Lens Reflex (DSLR) camera, an Android phone camera, and an iPhone camera, and properties, such as a focus, a focal length, a zoom factor, exposure, white balance, color space, a black level, a lens-shading map, and a tone map curve.

A parameter corresponding to at least one of a lens distortion parameter, a color distortion parameter, and white balance, which correspond to the camera, may be acquired and stored in a camera modeling DB.

The camera modeling DB may be constructed by storing various values related to the camera, including the lens distortion parameter, color distortion parameter, and white balance of the camera.

Here, pieces of data stored in the camera modeling DB may be used to distort or correct the attributes of the virtual content that is augmented and mixed so that the virtual content becomes similar to the actual image by changing the values of the corresponding data in real time whenever the values of the camera are changed.

Further, the virtual content-mixing method for augmented reality according to the embodiment of the present invention mixes the virtual content with the image input through the RGB camera based on the lighting physical-modeling data and the camera physical-modeling data at step S1530.

Here, a lighting modeling DB may be constructed by performing the step of verifying the lighting information and the lighting environment map.

In this case, a change in at least one of a color checker and a grayscale checker may be checked while fixed values are received for a plurality of parameters and lighting information is changed based on the fixed values, and the lighting modeling DB may be constructed based on the change in at least one of the color checker and the grayscale checker. That is, as the change in at least one of the color checker and the grayscale checker is checked, a value to which a color value or a grayscale value in rendering corresponds may be known, and thus the lighting modeling DB may be constructed based on values generated in this way.

The lighting information may correspond to at least one of the location, type, brightness, and color of the lighting.

Here, the shadow of the virtual content may be rendered based on the lighting modeling DB.

Here, at least one camera parameter corresponding to the image may be acquired. A plurality of parameters may be changed in accordance with the at least one camera parameter based on the camera modeling DB, and may then be applied to the rendering of the virtual content.

For example, lens distortion, color distortion, white balance, etc., which correspond to the image that has been input through the RGB camera, may be inversely applied to the 3D virtual content, and thus a mixed image in which the virtual content is naturally augmented and mixed with an actual image may be provided.

Here, a lighting environment map may be constructed in an array in 3D space using the previously created lighting environment map.

Here, the array-type lighting environment map may be incorporated into the 3D virtual content. In detail, the array-type lighting environment map may be applied so as to correspond to the coordinates of the 3D virtual content in space, such as an indoor room.

That is, the lighting environment map may be applied to the virtual content in such a way as to apply lighting properties allocated to coordinates corresponding to the location of the virtual content, among multiple coordinates that are included in the lighting environment map constructed in an array, to the virtual content.

Here, lighting properties of the coordinates corresponding to the location of the virtual content, among multiple coordinates, may be applied to the virtual content and may then be rendered.

Further, although not illustrated in FIG. 13, the virtual content-mixing method for augmented reality according to the embodiment of the present invention stores various types of information, generated during a virtual content-mixing procedure according to the embodiment of the present invention, in a separate storage module, as described above.

Figure 14:
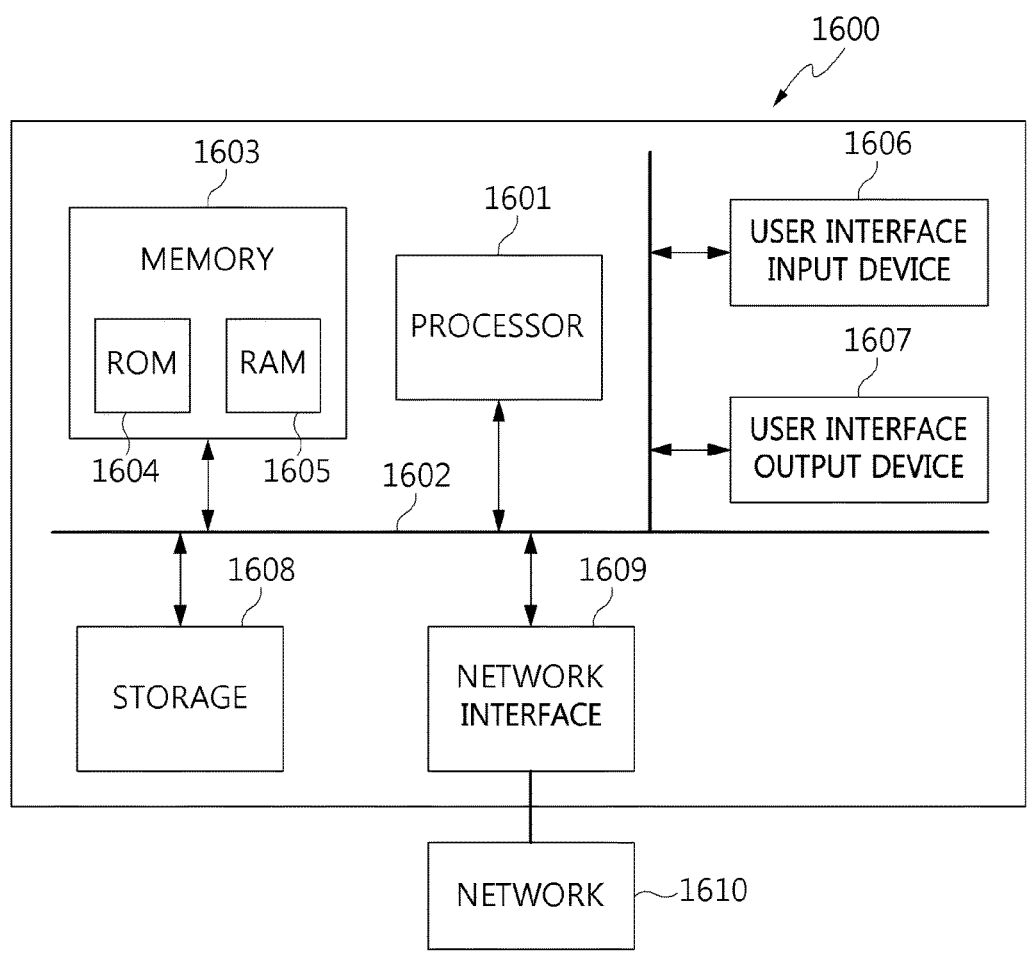
FIG. 14 is an embodiment of the present invention implemented in a computer system.

FIG. 14 is an embodiment of the present invention implemented in a computer system, e.g., as a computer readable medium. As shown in FIG. 14, a computer system 1600 may include one or more of a processor 1601, a memory 1603, a user input device 1606, a user output device 1607, and a storage 1608, each of which communicates through a bus 1602. The computer system 1600 may also include a network interface 1609 that is coupled to a network 1610. The processor 1601 may be a central processing unit (CPU) or a semiconductor device that executes processing instructions stored in the memory 1603 and/or the storage 1608. The memory 1603 and the storage 1608 may include various forms of volatile or non-volatile storage media. For example, the memory may include a read-only memory (ROM) 1604 and a random access memory (RAM) 1605.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

By means of the above-described virtual content-mixing method according to the present invention, a lighting effect similar to that of a captured actual image is applied to virtual content even if lighting is not actually present, and thus a more natural augmented reality service may be provided.

Further, the present invention may immediately incorporate changed items into 3D virtual content based on predefined and stored parameter values even if a parameter of a camera mounted on a mobile device is changed in real time.

Furthermore, the present invention may provide an augmented reality service, which can be stably operated even in low-specification devices, such as mobile devices, and can provide more natural mixed results.

As described above, in the virtual content-mixing method and the apparatus for the method according to the present invention, the configurations and schemes in the above-described embodiments are not limitedly applied, and some or all of the above embodiments can be selectively combined and configured such that various modifications are possible.

What is claimed is:

1. A virtual content-mixing apparatus, comprising:
a memory for storing lighting physical-modeling data generated in accordance with actual lighting information for outputting virtual content based on mirror ball image capture, and storing camera physical-modeling data generated by acquiring a plurality of parameters corresponding to a camera; and
a processor for mixing the virtual content with an image that is input through an RGB camera, based on the lighting physical-modeling data and the camera physical-modeling data,
wherein the processor is configured to check a change in at least one of a color checker and a grayscale checker while receiving fixed values for the plurality of parameters and changing the lighting information based on the fixed values, and to construct a lighting modeling database based on the change in at least one of the color checker and the grayscale checker.

2. The virtual content-mixing apparatus of claim 1, wherein the processor is configured to acquire lighting properties corresponding to the lighting information based on a lighting environment map, wherein the lighting environment map is created by representing at least two mirror ball images acquired based on mirror ball image capture by respective latitude-longitude images and by morphing the at least two latitude-longitude images.

3. The virtual content-mixing apparatus of claim 1, wherein the memory is configured to acquire a parameter corresponding to at least one of a lens distortion parameter, a color distortion parameter, and a white balance, which correspond to the camera, and to store the acquired parameter in a camera modeling database.

4. The virtual content-mixing apparatus of claim 3, wherein the processor is configured to acquire at least one camera parameter corresponding to the image, to change the plurality of parameters in accordance with the at least one camera parameter based on the camera modeling database, and to apply the changed parameters to rendering of the virtual content.

5. The virtual content-mixing apparatus of claim 2, wherein the lighting properties are allocated so as to respectively correspond to multiple coordinates included in the lighting environment map that is constructed in an array in a three-dimensional (3D) space.

6. The virtual content-mixing apparatus of claim 5, wherein the processor is configured to render the virtual content by applying lighting properties at coordinates corresponding to a location of the virtual content, among the multiple coordinates, to the virtual content.

7. The virtual content-mixing apparatus of claim 1, wherein the processor is configured to render a shadow of the virtual content based on the lighting modeling database.

8. A virtual content-mixing apparatus, comprising:
a memory for storing lighting physical-modeling data generated in accordance with actual lighting information for outputting virtual content based on an RGB sensor and a depth sensor, and storing camera physical-modeling data generated by acquiring a plurality of parameters corresponding to a camera; and
a processor for mixing the virtual content with an image that is input through an RGB camera, based on the lighting physical-modeling data and the camera physical-modeling data,
wherein the processor is configured to acquire images for respective camera angles based on the RGB sensor and the depth sensor, to extract a location of lighting based on RGB images, among the images for respective camera angles, to acquire a depth value based on depth images mapped to the RGB images, among the images for respective camera angles, and to obtain 3D coordinates of the lighting corresponding to the lighting information based on the location of the lighting and the depth value.

9. The virtual content-mixing apparatus of claim 8, wherein the memory is configured to acquire a parameter corresponding to at least one of a lens distortion parameter, a color distortion parameter, and a white balance, which correspond to the camera, and to store the acquired parameter in a camera modeling database.

10. The virtual content-mixing apparatus of claim 9, wherein the processor is configured to acquire at least one camera parameter corresponding to the image, to change the plurality of parameters in accordance with the at least one camera parameter based on the camera modeling database, and to apply the changed parameters to rendering of the virtual content.

11. A virtual content-mixing method, comprising:
generating lighting physical-modeling data based on actual lighting information for outputting virtual content;
generating camera physical-modeling data by acquiring a plurality of parameters corresponding to a camera; and
mixing the virtual content with an image that is input through an RGB camera, based on the lighting physical-modeling data and the camera physical-modeling data,
wherein generating the lighting physical-modeling data comprises:
checking a change in at least one of a color checker and a grayscale checker while receiving fixed values for the plurality of parameters and changing the lighting information based on the fixed values; and
constructing a lighting modeling database based on the change in at least one of the color checker and the grayscale checker.

12. The virtual content-mixing method of claim 11, wherein generating the lighting physical-modeling data comprises:
representing at least two mirror ball images acquired based on mirror ball image capture by respective latitude-longitude (lat-long) images;
creating a lighting environment map by morphing the at least two latitude-longitude images; and
acquiring lighting properties corresponding to the lighting information based on the lighting environment map.

13. The virtual content-mixing method of claim 11, wherein generating the lighting physical-modeling data comprises:
acquiring images for respective camera angles based on an RGB sensor and a depth sensor;
extracting a location of lighting based on RGB images, among the images for respective camera angles, and acquiring a depth value based on depth images mapped to the RGB images, among the images for respective camera angles; and
obtaining 3D coordinates of the lighting corresponding to the lighting information based on the location of the lighting and the depth value.

14. The virtual content-mixing method of claim 11, wherein generating the camera physical-modeling data is configured to acquire a parameter corresponding to at least one of a lens distortion parameter, a color distortion parameter, and a white balance, which correspond to the camera, and to store the acquired parameter in a camera modeling database.

15. The virtual content-mixing method of claim 14, wherein mixing the virtual content with the input image is configured to acquire at least one camera parameter corresponding to the image, to change the plurality of parameters in accordance with the at least one camera parameter based on the camera modeling database, and to apply the changed parameters to rendering of the virtual content.

16. The virtual content-mixing method of claim 12, wherein the lighting properties are allocated so as to respectively correspond to multiple coordinates included in the lighting environment map that is constructed in an array in a 3D space.

17. The virtual content-mixing method of claim 16, wherein mixing the virtual content with the input image is configured to render the virtual content by applying lighting properties at coordinates corresponding to a location of the virtual content, among the multiple coordinates, to the virtual content.

18. A virtual content-mixing method, comprising:
generating lighting physical-modeling data based on actual lighting information for outputting virtual content;
generating camera physical-modeling data by acquiring a plurality of parameters corresponding to a camera; and
mixing the virtual content with an image that is input through an RGB camera, based on the lighting physical-modeling data and the camera physical-modeling data,
wherein generating the lighting physical-modeling data comprises:
acquiring images for respective camera angles based on an RGB sensor and a depth sensor;
extracting a location of lighting based on RGB images, among the images for respective camera angles, and acquiring a depth value based on depth images mapped to the RGB images, among the images for respective camera angles; and
obtaining 3D coordinates of the lighting corresponding to the lighting information based on the location of the lighting and the depth value.

* * * * *